(12) United States Patent
Elizer et al.

(10) Patent No.: US 7,744,691 B2
(45) Date of Patent: Jun. 29, 2010

(54) ENERGY CONSERVING POZZOLAN COMPOSITIONS AND CEMENTS INCORPORATING SAME

(75) Inventors: Mark C. Elizer, Wellington, FL (US); Ronald W. Reed, Indian Trail, NC (US)

(73) Assignee: Calcium Silicate Corporation, Lake Harbor, FL (US)

( * ) Notice: Subject to any disclaimer, the term of this patent is extended or adjusted under 35 U.S.C. 154(b) by 268 days.

(21) Appl. No.: 12/100,885

(22) Filed: Apr. 10, 2008

(65) Prior Publication Data

US 2008/0250981 A1    Oct. 16, 2008

Related U.S. Application Data

(60) Provisional application No. 60/910,962, filed on Apr. 10, 2007.

(51) Int. Cl.
*C04B 14/04* (2006.01)
*C04B 14/22* (2006.01)

(52) U.S. Cl. ........................ 106/716; 106/737; 106/745

(58) Field of Classification Search ................. 106/716, 106/737, 745
See application file for complete search history.

(56) References Cited

U.S. PATENT DOCUMENTS 6,776,838 B2 *   8/2004   Hemmings et al. .......... 106/716

\* cited by examiner

*Primary Examiner*—Paul Marcantoni
(74) *Attorney, Agent, or Firm*—GrayRobinson, P.A.

(57) ABSTRACT

Pozzolan compositions incorporate glassy, amorphous particulates derived from byproducts of processes in which substantial energy was invested in generating those byproducts, at least one of which comprises amorphous calcium silicate slag generated as a byproduct of phosphorous production. The calcium silicate particulate is blended with one or more additional pozzolans, preferably one or more particulates of a material selected from the group consisting of fused silica of the type generated as a byproduct of making refractory grade fused silica and cullet glass of the type rejected from glass making processes. Pozzolanic cements incorporating up to about 50% by weight of such pozzolan compositions are also disclosed.

17 Claims, No Drawings

ENERGY CONSERVING POZZOLAN COMPOSITIONS AND CEMENTS INCORPORATING SAME

CROSS-REFERENCE TO RELATED APPLICATIONS

This is a continuation-in-part of U.S. Provisional patent application Ser. No. 60/910,962 filed Apr. 10, 2007, to which priority is claimed under 35 U.S.C. §119(e).

STATEMENT REGARDING FEDERALLY SPONSORED-RESEARCH OR DEVELOPMENT

Not Applicable.

INCORPORATION BY REFERENCE

Not Applicable.

FIELD OF THE INVENTION

The invention relates to the field of pozzolans and pozzolanic cements. More particularly, the invention relates to pozzolan compositions which comprise a suitably proportioned, and suitably finely-divided, particulate blends of calcium silicate with one or more amorphous, glassy byproducts of a manufacturing process. According to a preferred embodiment, the pozzolan composition is produced from calcium silicate generated as a byproduct of the production of elemental phosphorus and the byproduct is one selected from the group consisting of fused silica derived from the manufacture of high purity refractory grade fused silica, and amorphous cullet glass derived from a glass manufacturing process. A further aspect of the invention relates to pozzolanic cements in which a pozzolan incorporating calcium silicate and at least one of the other aforementioned byproducts, is admixed with portland cement.

BACKGROUND OF THE INVENTION

Pozzolans of various particular kinds are known in the prior art as being useful as performance-enhancing additives for cement, mortar, grout, stucco and concrete. Unless otherwise indicated, the term "cement" is used herein to refer collectively to cement, mortar, grout and stucco and "concrete" is used to refer to a mixture of an aggregate with a cement. Though pozzolans by themselves are generally of little, if any, use as a cement, the addition of pozzolans to either common or hydraulic portland cement enhances both the initial and long term physical properties of the cement. Pozzolans continue to participate in bond-forming reactions react in cement for many years, further strengthening the concrete and making it harder and more durable as time passes. Pozzolans also serve to densify and reduce water permeability of cured concrete thereby making the cement or concrete more resistant to deterioration and swelling caused by exposure to various conditions.

A pozzolan is a siliceous, or siliceous and aluminous, substance which will react at ordinary temperatures with calcium hydroxide formed during the hydration of cement to create additional cementitious material in the form of dicalcium and tricalcium silicate and calcium silico-aluminate hydrates. The American Society for the Testing and Materials Standard ASTM C-618, entitled "Standard Specification for Coal Fly Ash and Raw or Calcined Natural Pozzolan for Use As a Mineral Admixture in Concrete" defines various classes of pozzolans. For example, a Class "N" Pozzolan are defined therein as "raw or calcined natural pozzolans that comply with the applicable requirements for the class as given herein, such as some diatomaceous earths; opaline cherts and shales; tuffs and volcanic ashes or pumices, calcined or uncalcined: and various materials requiring calcination to induce satisfactory properties, such as some clays and shales." Class F Fly Ash is defined as "fly ash normally produced from burning anthracite or bituminous coal that meets the applicable requirements for this class as given herein. This class of fly ash has pozzolanic properties." Class C Fly Ash is defined as "fly ash normally produced from lignite or sub-bituminous coal that meets the applicable requirements for this class as given herein treated this class of fly ash, in addition to having pozzolanic properties, also has some cementitious properties."

Portland cement is a fine powder produced by grinding portland cement clinker. The major raw material for making portland cement clinker is a mixture of calcium carbonate ($CaCO_3$), usually in the form of crushed limestone, and materials containing clay as a source of alumino-silicate. Normally, an impure limestone which contains clay or $SiO_2$ is used. Some of the secondary raw materials which can be incorporated in the mixture for making clinker are: clay, shale, sand, iron ore, bauxite, fly ash and slag. The raw mixture is heated in a cement kiln, a slowly rotating and sloped cylinder, with temperatures increasing over the length of the cylinder up to a peak temperature of about 1400-1450° C. A complex succession of chemical reactions take place as the temperature rises. The resulting clinker is a hydraulic material which consists of at least two-thirds by mass of dicalcium and tricalcium silicates ($3CaO.SiO_2$ and $2CaO.SiO_2$) with the balance consisting mainly of aluminum-containing, and iron-containing, clinker phases and other compounds. The aluminum oxide and iron oxide are present as a flux and contribute little to concrete strength.

Due to the high temperature needed, the production of portland cement clinker requires large amounts of energy. The enthalpy of formation of clinker from calcium carbonate and clay minerals is about 7.1 MBTU per ton. However, because of heat loss inherent in actual production processes, the total heat input required can be much higher. The high energy requirements and the liberation of significant amounts of carbon dioxide in the course of generating the energy necessary to satisfy production requirements make cement production a significant source of carbon dioxide ($CO_2$) emissions. $CO_2$ release to the atmosphere on the order of 1.1 tons per ton of cement is not atypical. It has been estimated that portland cement production may account for as much as 5% of $CO_2$ emissions worldwide.

The incorporation of certain types of pozzolans in cement is known in the art. For example, standard ASTM C-150 classifies portland cements as one of five basic types. The first three types allow for specific pozzolan additions in accordance with overall chemical and physical performance criteria. For example, "Type I" is considered common, or general purpose, portland cement. It is typically used for general construction and is especially useful for making precast and precast-pre-stressed concrete members that are not to be used in contact with soils or ground water. Using cement industry notation, a typical composition of a Type I portland cement is: 55% (C3S), 19% (C2S), 10% (C3A), 7% (C4AF), 2.8% MgO, 2.9% (SO3), 1% free (CaO). Type II cement is intended to have moderate sulfate resistance with or without moderate heat of hydration and is suitable for general use in contact with ground water exposed to moderate sulfide attack. A typical composition of a Type II portland cement would be 51% (C3S), 24% (C2S), 6% (C3A), 11% (C4AF), 2.9% MgO, 2.5% (SO3), 1% free (CaO) with C3A not exceeding shall not exceed 8% and (C3A+C3S) not exceeding 58%. Type III portland cement exhibits relatively high early strength. A typical composition thereof is: 57% (C3S), 19% (C2S), 10% (C3A), 7% (C4AF), 3.0% MgO, 3.1% (SO3), 1.3% free (CaO). A Type IV portland cement is slow curing and is generally known for its low heat of hydration. A typical composition of Type IV is: 28% (C3S), 49% (C2S), 4% (C3A), 12% (C4AF), 1.8% MgO, 1.9% (SO3), 0.8% free (CaO) with C3A not in excess of 7% and C3S not in excess of 35%. Type V portland cements are typically used where sulfate resistance is important, such as applications with exposure to high alkali soil and/or sulfate groundwater. A typical Type V composition is: 38% (C3S), 43% (C2S), 4% (C3A), 9% (C4AF), 1.9% MgO, 1.8% (SO3), 0.8% free (CaO) with C3A>2% and (2C3A+C4AF) not in excess of 20%.

ASTM C-1157 deals with hydraulic cements. That standard does not impose restrictions the chemical composition of the cement itself or its additives. Rather, it establishes standards of physical performance indicating the suitability of a cement for particular applications. For example:

Type GU—General Purpose cement
Type HE—High Early-Strength
Type MS—Moderate Sulfate Resistance
Type HS—High Sulfate Resistance.
Type MH—Moderate Heat of Hydration.
Type LH—Low Heat of Hydration.

ASTM Standard C-595 sets forth specifications for five classes of blended hydraulic cements for general and special application, using slags, pozzolans, or both, blended with portland cement.

Type IS—Portland/Blast Furnace Slag Cement—includes 25% to 70% blast furnace slag.

Type IP & P—Portland/Pozzolan cement—includes 15 to 40% pozzolan blended with either portland cement or Type IS cement.

Type I (PM)—Pozzolan modified portland cement—includes <15% Pozzolan blended with either portland cement or Type IS cement.

Type S—Slag cement>70% blast furnace slag ASTM C 989 blended with either portland cement or hydrated lime.

Types IA, IIA, and IIIA are the same as I, II, and III with the addition of air-entraining additives. Similarly, suffix MS is used to indicate moderate sulfide resistance, and suffix MH us to indicate moderate heat of hydration. Other suffixes are used to indicate subtypes exhibiting other particular properties.

ASTM Standards ASTM C-150, ASTM C-465, ASTM C-595, ASTM C-618, ASTM C-989 and ASTM C-1157 are expressly incorporated herein in their entireties to form part of the present disclosure.

U.S. Pat. No. 6,776,838 describes a white pozzolan, and a cement incorporating white pozzolan derived from byproducts of manufacturing vitreous low alkali, low iron, glass fibers such as those used for example and fiberglass thermal insulation. Bundles all of entangled strands of waste glass fibers are adjusted for moisture content, shredded, ground, and classified to control maximum particle size, particle distribution and aspect ratio before being blended with portland cement.

However, the prior art does not appear to disclose, suggest or otherwise motivate a person of ordinary skill in the art to provide a blended pozzolan composition comprised of calcium silicate and at least one waste byproduct of a glass material or glass product production processing process. In particular, the prior art lacks any teaching or motivation to provide a pozzolan composition which comprises calcium silicate, itself a waste byproduct of the production of elemental phosphorous, with cullet glass recovered from a glass-making facility and/or fused silica recovered from the process of making high purity refractory grade-fused silica. The prior art also lacks pozzolanic cements in which a pozzolan composition of the aforementioned makeup is admixed with a portland cement.

SUMMARY OF THE INVENTION

The present invention recognizes that when suitably finely divided, granules of amorphous calcium silicate, such as those which can be produced from amorphous calcium silicate slag gleaned as a byproduct of the production of elemental phosphorous can be combined in appropriate proportion with suitably finely divided particulate forms of amorphous cullet glass and/or amorphous fused silica, to produce a blended composition which exhibits high pozzolanic reactivity in the presence of portland cement and water in amounts appropriate for cement hydration.

A further aspect of the invention provides a pozzolanic cement whose production is not only energy efficient but also makes productive use of materials which would otherwise be disposed of as a waste and thus, present an environmental burden which can be avoided through the present invention. These and other aspects and advantages of the invention can be more thoroughly understood by considering the nature and origin of the raw materials used in a pozzolanic compositions of the present invention.

Calcium silicate is generated in large quantities as a byproduct of the production of elemental phosphorus. Phosphate rock containing calcium and iron is crushed and sized, calcined and fed to an electric arc furnace with stoichiometric balance additions of silica and coke. The phosphorous production process generates calcium silicate and ferrophosphorous which are intermittently tapped from the bottom of the reaction furnace in molten form. Each ton of phosphorous produced requires bottom tapping of seven tons of calcium silicate and ferrophosphorous, the latter of which is tapped separately. As molten calcium silicate exits the furnace, it is rapidly quenched in a sluice. As a result, the material freezes into glassy, amorphous (i.e., non-crystalline) granules. Because a stoichiometric balance of ore and silica admixture must be maintained in order to produce elemental phosphorous, the calcium silicate byproduct exhibits a consistent chemistry which will be described in further detail below.

The energy input required to produce elemental phosphorous is very high. The electric arc furnaces used require large amounts of energy necessary to process the raw materials. In addition, all feedstocks are precalcined and crushed before introduction to the fusion process for impurity reduction and removal.

The cullet glass which may be used in preferred embodiments of the invention, is derived from reject material discarded as a byproduct of a glass production processes. Accumulations of such reject material are routinely tapped from glass production furnaces and quenched to form an amorphous vitreous aggregate which is ordinarily disposed of as waste.

A preferred form of amorphous fused silica which can be used in the invention is derived from fines resulting from the grading and crushing of refractory grade fused silica. Refractory grade fused silica is a high purity material produced in a non-contacting arc furnace. High purity sand feedstock is melted via conduction and infrared absorption emanating from an electric arc which is formed in the furnace at the expense of a copious amount of energy. An amorphous ingot is formed which is subsequently crushed and graded in stages to produce granular fused silica of extremely high purity amorphous for use in various refractory applications. During the crushing and grading process, a high purity silica dust is formed. This dust is normally collected as baghouse waste for disposal in a landfill. As in the case of the calcium silicate and cutlet glass, the amount heat energy invested in this "waste" silica dust is very high.

A further aspect of the invention provides pozzolanic cements formed from a cement mix which incorporates a calcium silicate-containing pozzolan composition of the type described above in admixture with portland cement. In preferred embodiments, the pozzolan composition represents 5% to 50% by weight of the overall pozzolanic cement mix prior to hydration. This range makes it possible to formulate pozzolanic cements in accordance with the invention which comply with ASTM Standard C-595 for any of Types P, IP, I(PM) and/or air-entrained (i.e. suffix A) subtypes thereof. Moreover, as demonstrated by the test results below, pozzolanic cements according to the invention exhibit both satisfactory initial strength and good increase in strength over time.

Owing to the large energy expenditure which is also needed to produce portland cement clinker, the substitution of the pozzolanic composition of this invention for up to about fifty percent (50%) of ground cement clinker contributes even further to the energy conservation afforded by the invention.

A preferred embodiment of a pozzolanic composition according to the invention comprises a blend of calcium silicate particles with particles of either or both cullet glass and fused silica wherein the particles of each of the constituent materials are sufficiently timely divided, and have sufficient surface area, as to enable each of the constituent materials present in the blend to exhibit substantial pozzolanic reactivity in the presence of a paste of portland cement and water in proportions suitable for hydration of the cement. The calcium silicate particles are preferably derived from calcium silicate slag of the type generated as a byproduct of phosphorous production. The cullet glass particles are preferably derived from vitreous reject material generates as a byproduct of a glass production process and the fused silica particles are preferably derived from waste material generated from the crushing and/or grading of refractory grade fused silica. Calcium silicate particles preferably constitutes about 35% to 98% by weight of the blend with fused silica particles not exceeding about 40% by weight and cullet glass not exceeding about 25% by weight of the blend.

In embodiments where both fused silica and cullet glass particles are present along with calcium silicate particles, the fraction of the blend represented by the cullet glass and fused silica combined, preferably does not exceed about 65% by weight of the blend while the cullet glass preferably does not exceed about 40% by weight of the aforementioned fraction and fused silica preferably does not exceed about 25% by weight of that fraction.

A further aspect of the invention provides pozzolanic cements which incorporate a pozzolan composition of a type a described herein. In preferred embodiments, the pozzolan composition can represent up to about 50% by weight of the portland cement mix which is used to make the pozzolanic cement upon being suitably hydrated.

DETAILED DESCRIPTION OF A PREFERRED EMBODIMENT

According to a preferred embodiment of the invention, a pozzolan composition comprises a blend of particles of amorphous forms of calcium silicate particles with particles of amorphous forms of either cutlet glass alone or fused silica alone. Alternatively, the amorphous calcium silicate particles may be blended with both fused silica particles and particles of cullet glass.

The calcium silicate particles are preferably derived from calcium silicate slag of the type described above which is generated as a byproduct of phosphorous production. The particles are preferably prepared by crushing and classifying the raw calcium silicate slag into fine particles. When combined with cutlet glass particles and/or fused silica particles of the types described below, the blend of particles should be of sufficiently fine size and have sufficient surface area as to enable them to react pozzolanically in the presence of a cement paste which includes portland cement comprised of finely crushed portland cement clinker and water in proportions appropriate for hydration of the paste. A typical chemistry of the calcium silicate slag and particles thereof is expressed conventionally in the terms of oxides in Table 1 below. It is to be understood that expressing a chemical composition in this manner does not imply that such oxides are present as distinct compounds in the amorphous material. While any form of calcium silicate particles exhibiting, or contributing to pozzolanic reactivity in the wet paste environment described above could suitably be used. Pozzolanic compositions in accordance with preferred embodiments of the invention can be prepared using amorphous calcium silicate particles whose median size may range from about 17 microns to about 21 microns and are characterized by a Blaine Air Permeability Test value which may range from about 4,000 $cm^2$/gm to about 6,000 $cm^2$/gm and is most preferably about 5,000 $cm^2$/gm.

Amorphous cullet glass particles are preferably prepared by crushing and classifying cullet glass of the type produced when vitreous reject material is tapped from a glass production vessel and quenched. The cullet glass particles should be of sufficiently fine size and have sufficient surface area as to enable them to react pozzolanically in the presence of a cement paste which includes portland cement and water in proportions appropriate for hydration of the paste. Although its chemical composition can vary depending on the particular type of glass being produced in the process from which the cullet glass is recovered, a composition representative of a suitable cullet glass is given in Table 1. Again, the use of the oxide convention used in Table 1 should not be taken to imply that the indicated oxides are necessarily present as distinct from the amorphous material. While any form of cullet glass particles exhibiting pozzolanic reactivity in the environment described above could suitably be used, preferred embodiments of pozzolanic compositions in accordance with the invention can be prepared using amorphous cullet glass particulate whose median particle size may range from about 17 microns to about 21 microns and which have a surface area represented by a Blaine Air Permeability Test value which may range from about 4,000 $cm^2$/gm to about 6,000 $cm^2$/gm, and is most preferably about 5,000 $cm^2$/gm or more.

Preferred particles of amorphous fused silica are ones prepared from fines captured as waste generated from the crushing and/or grading of high purity refractory grade fused silica. If the recovered material is not already in the form of suitable particles, it is crushed and classified to yield suitable particulate. The fused silica particulate material should be of sufficiently fine size, and have sufficient surface area, as to enable it to react pozzolanically in a suitably hydrated cement mix. A typical chemical composition of a suitable amorphous fused silica and particles thereof is expressed conventionally in terms of oxides in Table 1 below. It is again pointed out that the oxide convention does not imply the presence of the indicated oxide forms in the amorphous particulate.

While any form of fused silica particles exhibiting pozzolanic reactivity in the presence of hydrated crushed portland cement clinker could suitably be used, preferred embodiments of pozzolanic compositions in accordance with the invention can be prepared using amorphous fused silica particulates whose median particle size may range from about 10 microns to about 21 microns and exhibit a Blaine Air Permeability Test value ranging from about 3,000 $cm^2$/gm to about 9,000 $cm^2$/gm.

TABLE 1

MEAN COMPOSITION BY WT. %

| Components (Expressed as Oxides) | Amorphous Calcium Silicate $CaSiO_2$ | Amorphous Cullet Glass | Amorphous Fused Silica |
|---|---|---|---|
| Silicon Dioxide | 43.4 | 57 | 99+ |
| Aluminum Oxide | 3.3 | 14 | <0.01 |
| Iron Oxide | 0.3 | 0.04 | <0.1 |
| Calcium Oxide | 41.4 | 20.5 | <0.01 |
| Magnesium Oxide | 0.2 | 2.5 | <0.01 |
| Sodium + Potassium Oxides | 0.8 | 1 | <0.1 |
| Boron Oxide | 0.2 | 5 | <0.01 |
| Titanium Dioxide | 0.1 | 0.8 | <0.1 |
| Fluorine | 0.2 | 0.5 | <0.001 |

The crushing and classifying of particles to select those having the characteristics described above can be carried out separately for each material to be included in the blend alternatively, two or more constituents of the blend could be crushed and/or classified together when the particle sizes and particle surface areas of different ones of the constituents permit. It will also be appreciated that processing to form suitable particulates of any or all of the raw byproduct materials to be incorporated in a given blend could be implemented as either a batch type process or a more or less continuous line type process. Most preferably, the particulates of each of the constituents of the pozzolanic blend should be fine enough to be characterized by Blaine Test values of at least about 5,000 $cm^2$/gm.

Unless such blending is carried out in the course of crushing and/or classifying them together at once, the amorphous particulates of calcium silicate and those of cullet glass and/or fused silica are blended together, by mixing or otherwise, to create an admixture in which each of same is substantially uniformly dispersed.

In accordance with a further aspect of the invention, a mix for making a pozzolanic cement comprises a pozzolan composition according to the aspect of the invention which has just been described, in admixture with powdered portland cement clinker with the pozzolanic composition comprising a fraction ranging from about 5% to about 50% by weight of the admixture. A pozzolanic cement in accordance with the invention is formed by hydrating the cement/pozzolan admixture. Air entraining additives and/or processing additives such as plasticizers, water requirement reducers, or the like may optionally be included where necessary or desirable to meet the needs of a particular application. Conventional additives of such types and common impurities are not excluded by the invention.

A first preferred embodiment of a pozzolanic cement in accordance with the invention is formed by hydrating an admixture of finely ground portland cement clinker and a calcium silicate-containing pozzolan composition according to the invention described above such that the pozzolan composition represents about 15% to about 40% by weight of the portland/pozzolan admixture and thus is capable of conforming to ASTM Standard C-595 for a Type IP blended Portland/Pozzolan cement. An air entraining additive may be included for applications calling for a Type IPA cement.

A second embodiment of a pozzolanic cement in accordance with the invention is prepared as in the case of the first embodiment which has just been described except that amount of the pozzolanic composition present is reduced so as to represent less than 15% by weight of the admixture. This embodiment is therefore one capable of complying with ASTM Standard C-595 for a Type I(PM) or, upon addition of an air entrainment additive, Type I(PM)A.

Example 1

Amorphous calcium silicate slag in the form of byproducts recovered as from a phosphorous production process and having a chemical composition substantially as indicated in Table 1 was crushed into a particulate of which 4.2% by weight was blocked from passage through a 325 mesh size classifier sieve. In preferred embodiments, a particulate in which 10% by weight, or less, is blocked would be considered to have a suitable mean in particle size. The particulate was of a surface area corresponding to a Blaine Air Permeability Test value of 5860 $cm^2$/gm.

Amorphous fused silica in the form of a waste byproduct recovered from the process of producing high purity, refractory grade fused silica and having a composition substantially as indicated in Table 1 was crushed into a particulate which was passed through a 325 mesh sieve which blocked 4.8% by weight of the particulate. That figure being less than the aforementioned 10% by weight which is a suitable upper limit for best results, the mean particle size was deemed acceptable. Again being below 10%, that figure was considered suitable. The particulate was subjected to a Blaine Air Permeability Test and found to have a particle surface area corresponding to 5280 $cm^2$/gm.

Amorphous cullet glass generated as a byproduct of a glass production process and having a composition substantially as indicated in Table 1 above, was recovered and crushed into a particulate of which 4.9% by weight was blocked from passage through a 325 mesh size classifier sieve. The particulate had a Blaine Air Permeability Test value of 5640 $cm^2$/gm.

After blending the particulates of amorphous calcium silicate, fused silica and cullet glass in proportions of one-third (⅓) each to form a pozzolan composition according to the invention, mortar cube samples were prepared by preparing a dry admixture of the pozzolan composition and powdered portland cement clinker in accordance with the ASTM C-618 Standard such that the pozzolan composition represented twenty percent (20%) by weight of the portland/pozzolan admixture with the balance thereof represented by the powdered portland cement clinker. After hydration of the portland/pozzolan admixture to form a pozzolanic cement in accordance with the invention, test cubes were prepared in accordance with ASTM Standard C-618. Substantially concurrently with the preparation of the test cubes, control cubes were prepared in a like manner except that the control cubes were formed from of 100% hydrated powdered portland cement clinker in accordance with the aforementioned standard.

Test cubes and control cubes were subjected to ASTM C-618 mortar cube strength tests after curing for successive intervals of 3 days, 7 days and 28 days. Results, expressed as both psi, and as percentages of those measured for the correspondingly aged test cubes are given in Table 2.

TABLE 2

| Sample | % Water Demand | Day 3 | | Day 7 | | Day 28 | |
|---|---|---|---|---|---|---|---|
| | | PSI | % of Control | PSI | % of Control | PSI | % of Control |
| Control Cube | 100 | 3640 | 100 | 4540 | 100 | 6690 | 100 |
| Test Cube | 100 | 2760 | 76 | 3680 | 81 | 6800 | 102 |

Example 2

Test cubes and control cubes were prepared and tested as in Example 1 except that ASTM Standard C-989 was followed such that 50% by weight of the admixture of crushed portland cement clinker and pozzolanic composition was represented by the pozzolanic composition prior to hydration of the admixture (rather than the 20% by weight used to produce the test cubes in Example 1). The control cubes were prepared as in Example 1 and the test cubes and control cubes were aged as in Example 1. Mortar cube strength tests were conducted per ASTM C-989 with measured results as given in Table 3.

TABLE 3

| Sample | % Water Demand | Day 3 | | Day 7 | | Day 28 | |
|---|---|---|---|---|---|---|---|
| | | PSI | % of Control | PSI | % of Control | PSI | % of Control |
| Control Cube | 100 | 3640 | 100 | 4840 | 100 | 6350 | 100 |
| Test Cube | 102 | 2475 | 68 | 4450 | 92 | 7700 | 121 |

Comparative Tests

A first comparative test was conducted on test cube samples prepared and tested under ASTM C-618 as in Example 1 except that the only pozzolanic material present in the portland/pozzolan admixture was amorphous fused silica particulate of the same type, and prepared in the same manner as described in Example 1. No amorphous calcium silicate or cutlet glass was included in the admixture however. The fused silica constituted 20% of the test cube admixture prior to hydration thereof. ASTM C-618 test results were measured per Table 4.

TABLE 4

| Sample | % Water Demand | Day 3 | | Day 7 | | Day 28 | |
|---|---|---|---|---|---|---|---|
| | | PSI | % of Control | PSI | % of Control | PSI | % of Control |
| Control Cube | 100 | 3640 | 100 | 4540 | 100 | 6690 | 100 |
| Test Cube | 101 | 2850 | 80 | 3900 | 86 | 6180 | 92 |

A second comparative test was run under ASTM Standard C-618 as in the first comparative test described immediately above except that instead of fused silica particulate, the only pozzolanic material present in the admixture used to prepare the test cubes was cutlet glass particulate of the same type, and prepared in the same manner, as in Example 1 above. In this second comparative test, the cullet glass particulate constituted 20% of the test cube admixture prior to hydrating the admixture to make the test cubes. Measured ASTM C-618 test results are given in Table 5.

TABLE 5

| Sample | % Water Demand | Day 3 | | Day 7 | | Day 28 | |
|---|---|---|---|---|---|---|---|
| | | PSI | % of Control | PSI | % of Control | PSI | % of Control |
| Control Cube | 100 | 3640 | 100 | 4540 | 100 | 6690 | 100 |
| Test Cube | 100 | 2580 | 71 | 3850 | 85 | 6420 | 96 |

A third comparative test was run, this time, under ASTM Standard C-989. Test cubes and control cubes were prepared in the manner as described with the first comparative test except that the fused silica particulate present in the portland/pozzolan admixture used to prepare the test cubes constituted 50% by weight of the test cube admixture prior to hydrating the admixture to make the test cubes. No amorphous calcium silicate particles or cutlet glass particles were used in the admixture. Measured ASTM C-989 results are given in Table 6.

TABLE 6

| Sample | % Water Demand | Day 3 | | Day 7 | | Day 28 | |
|---|---|---|---|---|---|---|---|
| | | PSI | % of Control | PSI | % of Control | PSI | % of Control |
| Control Cube | 100 | 3640 | 100 | 4840 | 100 | 6350 | 100 |
| Test Cube | 101 | 2150 | 59 | 4070 | 84 | 7200 | 113 |

A fourth comparative test was conducted. This test was carried out per ASTM Standard C-989. Test cubes and control cubes were prepared and tested as described above in connection with the third comparative test except that the portland/pozzolan admixture for making the test cubes was made up of 50% by weight of the cullet glass particulate. No fused silica or amorphous calcium silicate particulate was included in the admixture. ASTM C-989 test results are given in Table 7.

TABLE 7

| Sample | % Water Demand | Day 3 | | Day 7 | | Day 28 | |
|---|---|---|---|---|---|---|---|
| | | PSI | % of Control | PSI | % of Control | PSI | % of Control |
| Control Cube | 100 | 3640 | 100 | 4540 | 100 | 6690 | 100 |
| Test Cube | 101 | 2260 | 62 | 4100 | 85 | 7390 | 116 |

A fifth comparative test was conducted. This test was carried out per ASTM Standard C-989 and was as described in connection with the third and fourth comparative tests except that instead of including any cullet glass and/or fused silica particulate, the admixture used to make the test cubes constituted 50% by weight of amorphous calcium particulate of the type used in Example 1 and Example 2 above. No cullet glass, fused silica or other pozzolans were incorporated in the admixture. ASTM C-989 test results are given in Table 8.

TABLE 8

| Sample | % Water Demand | Day 3 | | Day 7 | | Day 28 | |
|---|---|---|---|---|---|---|---|
| | | PSI | % of Control | PSI | % of Control | PSI | % of Control |
| Control Cube | 100 | 3460 | 100 | 4840 | 100 | 6350 | 100 |
| Test Cube | 101 | 2400 | 66 | 4275 | 88 | 7610 | 120 |

A sixth comparative test was run per ASTM C-618. Test cubes were like those of the fifth comparative test except using 20% by weight, rather than 50% by weight, of the amorphous calcium silicate particulate. No cullet glass, fused silica or other pozzolan was added to the portland calcium silicate admixture. ASTM C-618 test results are given in Table 9.

TABLE 9

| Sample | % Water Demand | Day 3 | | Day 7 | | Day 28 | |
|---|---|---|---|---|---|---|---|
| | | PSI | % of Control | PSI | % of Control | PSI | % of Control |
| Control Cube | 100 | 3640 | 100 | 4540 | 100 | 6690 | 100 |
| Test Cube | 99 | 3240 | 89 | 4060 | 89 | 6600 | 99 |

Pozzolanic cements according to the invention can include about 5% to about 50% by weight of a pozzolan composition of the type disclosed herein. Because these pozzolan compositions are made from byproducts in which substantial energy has previously been invested, they benefit from the calcined, vitreous nature of the raw byproduct materials from which they are made. Accordingly, their use represents recovery of significant amounts of that energy. Because such compositions can be admixed with ground portland cement clinker in amounts representing up to 50% by weight of a portland/pozzolan admixture, even more energy is conserved due to the ability to displace substantial amounts of portland cement clinker, which itself requires much energy to make.

While the invention has been described with reference to preferred embodiments, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments which have been disclosed herein as the best mode presently contemplated by the inventors for carrying out this invention. Rather, the invention includes all embodiments falling within the scope of the appended claims and all legal equivalents thereof.

What is claimed is:

1. A pozzolanic composition, comprising:
   a blend of an amorphous calcium silicate particulate and at least one of (i) a cullet glass particulate and, (ii) a fused silica particulate, said particulates incorporated in said blend being present in effective proportions and having particles of sizes and surface areas effective to enable said blend to exhibit pozzolanic reactivity when mixed with a hydrated portland cement.

2. A pozzolanic composition as claimed in claim 1, wherein said calcium silicate particulate comprises particles derived from amorphous calcium silicate generated as a byproduct of the production of phosphorous.

3. A pozzolanic composition as claimed in claim 1, wherein said cutlet glass comprises particles derived from cullet glass generated as a byproduct of the production of a glass material.

4. A pozzolanic composition as claimed in claim 1, wherein said fused silica comprises particles derived from waste generated from the production of a refractory grade fused silica.

5. A pozzolanic composition as claimed in claim 1, wherein said calcium silicate particulate comprises about 35% to about 98% by weight of said blend.

6. A pozzolanic composition as claimed in claim 1, wherein said fused silica particulate does not exceed about 48% by weight of said blend.

7. A pozzolanic composition as claimed in claim 1, wherein said cullet glass does not exceed about 25% by weight of said blend.

8. A pozzolanic composition as claimed in claim 1, wherein said blend comprises both said cullet glass particulate and said fused silica particulate and wherein the total weight percentage of said blend which is represented by said cullet glass particulate and said fused silica particulate collectively does not exceed about 65%.

9. A pozzolanic cement mix, comprising:
   (a) a portland cement, and
   (b) a pozzolanic composition in admixture with said portland cement, said pozzolanic composition being a composition which includes amorphous calcium silicate particulate and at least one of (i) a cullet glass particulate and, (ii) a fused silica particulate, said particulates incorporated in said blend being present in effective proportions and having particles of sizes and surface areas effective to enable said blend to exhibit pozzolanic reactivity when mixed with a hydrated portland cement.

10. A pozzolanic cement mix as claimed in claim 9 wherein said calcium silicate particulate comprises particles derived from amorphous calcium silicate generated as a byproduct of the production of phosphorous.

11. A pozzolanic cement mix as claimed in claim 9, wherein said cullet glass comprises particles derived from cutlet glass generated as a byproduct of the production of a glass material.

12. A pozzolanic cement mix as claimed in claim 9, wherein said fused silica comprises particles derived from waste generated from the production of a refractory grade fused silica.

13. A pozzolanic cement mix as claimed in claim 9, wherein said calcium silicate particulate comprises about 35% to about 98% by weight of said pozzolanic composition.

14. A pozzolanic cement mix as claimed in claim 9, wherein said fused silica particulate does not exceed about 48% by weight of said pozzolanic composition.

15. A pozzolanic cement mix as claimed in claim 9, wherein said cutlet glass does not exceed about 25% by weight of said pozzolanic composition.

16. A pozzolanic cement mix as claimed in claim 9, wherein said blend comprises both said cullet glass particulate and said fused silica particulate and wherein the total weight percentage of said pozzolanic composition which is represented by said cullet glass particulate and said fused silica particulate collectively does not exceed about 65%.

17. A pozzolanic cement mix as claimed in claim 9 wherein said admixture is comprised of up to about 50% by weight of said pozzolanic composition.

* * * * *